US012391415B1

(12) United States Patent
John et al.

(10) Patent No.: US 12,391,415 B1
(45) Date of Patent: Aug. 19, 2025

(54) LANDING PLATFORM WITH MULTICOPTER SELF-ORIENTATION

(71) Applicant: Sunflower Labs Inc., San Carlos, CA (US)

(72) Inventors: Erik John, Aeschlen ob Gunten (CH); Alexander S. Pachikov, San Carlos, CA (US); Christian Eheim, Fällanden (CH); Dennis Kitainik, San Jose, CA (US)

(73) Assignee: Sunflower Labs Inc., San Carlos, CA (US)

( * ) Notice: Subject to any disclaimer, the term of this patent is extended or adjusted under 35 U.S.C. 154(b) by 40 days.

(21) Appl. No.: 18/530,989

(22) Filed: Dec. 6, 2023

Related U.S. Application Data

(60) Provisional application No. 63/431,898, filed on Dec. 12, 2022.

(51) Int. Cl.
*B64U 70/97* (2023.01)
*B64F 1/00* (2006.01)
*B64U 70/90* (2023.01)
*B64U 80/25* (2023.01)

(52) U.S. Cl.
CPC .............. *B64U 70/97* (2023.01); *B64F 1/007* (2013.01); *B64U 70/90* (2023.01); *B64U 80/25* (2023.01)

(58) Field of Classification Search
CPC ......... B64F 1/007; B64U 80/25; B64U 70/90; B64U 70/97
See application file for complete search history.

(56) References Cited

U.S. PATENT DOCUMENTS

| 11,987,402 B2* | 5/2024 | Howe | B64U 70/99 |
| 2017/0073084 A1* | 3/2017 | Mozer | B64F 1/02 |

* cited by examiner

*Primary Examiner* — Richard G Davis
(74) *Attorney, Agent, or Firm* — Westborough IP Group, LLC (57) ABSTRACT

A multicopter landing platform includes a top segment having a first opening at a top portion and a second, smaller opening at a bottom portion, a cross-section at the opening of the bottom portion, and a plurality of grooves formed in the top segment that guide a multicopter from the top portion of the top segment to the cross-section using gravity, the grooves applying a rotational torque to the multicopter to cause the multicopter to assume a particular orientation as the multicopter descends from the first opening of the top segment toward the cross-section. The grooves may engage with protrusions on the multicopter to apply the rotational torque thereto. The number of grooves may be derived from the number of protrusions of the multicopter. The grooves may extend to the cross-section. The grooves may cause the multicopter to rest at a fixed orientation when the multicopter is at the cross-section.

28 Claims, 5 Drawing Sheets

LANDING PLATFORM WITH MULTICOPTER SELF-ORIENTATION

CROSS-REFERENCE TO RELATED APPLICATIONS

This application claims priority to U.S. Prov. App. No. 63/431,898, filed on Dec. 12, 2022, and entitled "LANDING PLATFORM WITH MULTICOPTER SELF-ORIENTATION", which is incorporated herein by reference.

TECHNICAL FIELD

This application is directed to the field of hardware and software design of multicopters for residential, commercial, and industrial security systems, and more particularly to landing platform with multicopter self-orientation for precision landing and charging.

BACKGROUND OF THE INVENTION

According to DRONEII's Drone Market Report, the estimated size of the 2022 global market for Unmanned Aerial Vehicles (UAVs) is $30.6 billion. Various growth estimates for the global commercial drone market put its CAGR expectations to 8.3%-11.7% until 2030, which results in the estimates of the cumulative commercial and recreational drone market by 2030 between $55.8 billion and $73 billion. Major application areas for UAVs are evolving in industrial inspections, agriculture, oil & gas industry, mapping surveillance, modeling, delivery, security, etc. Top players in the UAV market include 3D Robotics, Parrot SA, SZ DJI Technology Co. Ltd., Birdseyeview Aerobotics Inc., AeroVironment Inc., etc.

Several companies, such as Sunflower Labs, Inc., are exploring new designs of multi-sensor home security and industrial inspection systems where autonomous camera vehicles, including UAVs, may reside within the perimeter of an owner's property and may be routed automatically or under owner's supervision for video recording and real-time inspections of unusual activities or potential intrusion of the property detected by sensors. In this role, UAVs are increasingly used for inspection of industrial, infrastructure and communal objects, including warehouses, railways, TV towers, power generation and distribution systems, stadiums, etc.

In many markets and application areas, UAVs may be required to function year round, irrespective of the season, in different climate zones and under diverse weather conditions. Accordingly, UAVs may be permanently subjected to difficult and potentially harmful usage conditions: rain, snow and ice, winds and heat, dust, dirt, and falling leaves may cause instant or gradually accumulating damage to many UAV components, including mechanical parts, engine, electronics, and camera optics. For example, hard landing or loss of control over landing may cause serious damage both to the UAV and to the environment (and, potentially, to industrial structures such as power lines, fences, and poles, to livestock, and to people). UAVs with a camera mounted in a bottom part, representing the mainstream design of many UAV models, may suffer broken or scratched camera lenses. Rotors may suffer from tall grass and pebble strikes; dirt may be blown through motor bearings and cause premature motor failures, etc.

To make UAV landing safer, numerous models of landing pads have been made available by drone manufacturers, standalone companies, and do-it-yourself enthusiasts. For the most part, these pads may be characterized as temporary mobile landing spots unfolded over a desired random landing place. Such landing pads may address basic landing safety concerns; select models, such as the STABLE UAV platform, have gyroscopic stabilization and certain assistance for precise landing. However, landing pads as a short-term landing solution lack many important features. In the first place, such mobile devices are uncapable of offering a long-term, all-season protection for a stationary drone that resides outdoors and is periodically flying on its assignments. In addition, these minimalist solutions lack charging capabilities and many other beneficial or necessary features.

A complete landing solution for drones, known as a landing platform, is a stationary or mobile device capable of protecting the drone at the landing phase and as a long-term drone home with charging, all-season weather protection and other features. Several models of landing platforms, such as offered by HiveUAV, H3 Dynamics or Skysense (charging pad) are relatively expensive products and are often more compact than landing pads. Their size and construction make precise drone landing both a requirement and a challenge, given the increased turbulence of air currents near the surface that impede smooth landing.

SUMMARY OF THE INVENTION

Sunflower Labs, Inc. has designed a UAV landing platform with a special funnel construction of the interior of the platform and a three-phase landing routine, whereby a descending multicopter, designed by Sunflower Labs, touches the funnel-shaped platform with the rounded bottom of the multicopter and with one or two of bottom parts of motor compartments of the multicopter and slides down the funnel of the landing platform, driven by the force of gravity and by the special shape of the funnel's slope, until the multicopter reaches a final landing position where the multicopter rests securely and may be charged, as described in U.S. Pat. No. 11,111,016 by Pachikov, et al. issued on Sep. 7, 2021 and titled: "MULTICOPTER THREE-PHASE PRECISION AUTO-LANDING", which is incorporated by reference herein.

The Sunflower Labs landing platform uses a multicopter charger constructed as a charging ring, potentially split into cathode and anode semi-rings. In one of the implementations, the multicopter has pogo pins at the bottom of each motor compartment of the multicopter, activating the charging process when the pogo pins touch the charging ring, which corresponds to a bottom position of the multicopter on the landing platform.

Notwithstanding the progress in developing advanced UAV landing platforms demonstrated by Sunflower Labs, there is space for important improvements and new designs. Because of the random rotation angle of the motor compartments with respect to the platform at the final landing position where the multicopter rests and may be charged, the charging contacts at the bottom of the multicopter (e.g., pogo pins) may touch the charging surface anywhere, forcing the Sunflower Labs construction to use a full circle of expensive charging rings. Additionally, an idea of continuous use of the UAV camera to monitor the space in the vicinity of the landing platform cannot be properly implemented because of the random direction of the camera angle after the landing of the multicopter.

Accordingly, it is useful to create the landing platform that allows self-orientation of the multicopter and puts charging contacts and camera view of the multicopter into predefined positions and orientations within the platform.

According to the system described herein, a multicopter landing platform includes a top segment having a first opening at a top portion thereof and a second, smaller opening at a bottom portion thereof, a cross-section at the opening of the bottom portion of the top segment, and a plurality of grooves formed in the top segment that guide a multicopter from the top portion of the top segment to the cross-section using gravity, the grooves applying a rotational torque to the multicopter to cause the multicopter to assume a particular orientation as the multicopter descends from the first opening of the top segment toward the cross-section. The grooves may engage with protrusions on the multicopter to apply the rotational torque thereto. The number of grooves may be derived from the number of protrusions of the multicopter. The grooves may extend to the cross-section. The grooves may cause the multicopter to rest at a fixed orientation when the multicopter is at the cross-section. A shape of the cross-section may be a convex polygon with rounded corners and straight sides or an epitrochoid-like polygon with concave sides. The shape of the cross-section may have four sides. The grooves may rotate the multicopter to adopt the fixed orientation prior to the multicopter arriving at the cross-section. The multicopter landing platform may also include charging pads that align with charging contacts of the multicopter when the multicopter rests at the cross-section. The charging pads may be provided at an interior surface of the landing platform. The charging pads may be provided in the grooves of the landing platform. The top opening may be circular. The cross-section may be in a horizontal plane. The cross-section and additional cross-sections that are parallel to the cross-section may have a radial symmetry. The cross-section and the additional cross-sections may correspond to two concentric circles, one of the circles being circumscribed and the other one of the circles being inscribed. A radial distance between the two concentric circles may approximate a depth of the grooves at any of the cross-sections. A change in shape of the landing platform from the top segment to the cross-section may have either a constant rate of change or a rate of change that increase toward the cross-section, the rate of change providing a linear or a concave transformation curve. Width of the grooves decreases and depth of the grooves increases as a distance from the top opening increases. The multicopter landing platform may also include a bottom segment coupled to the bottom portion of the top segment at the cross-section, where the bottom portion maintains the multicopter in an upright position.

According further to the system described herein, landing a multicopter on a landing platform includes positioning the multicopter over a top segment of the landing platform, the top segment having a first opening at a top portion thereof, a second, smaller opening at a bottom portion thereof, and a cross-section at the opening of the bottom portion of the top segment, reducing thrust of the multicopter to cause the multicopter to touch the top segment and to descend in the landing platform, the top segment having grooves therein that engage with protrusions of the multicopter to guide the multicopter with gravity toward the cross-section, and the multicopter moving downward toward the cross-section, where the grooves apply a rotational torque to the protrusions of the multicopter to cause the multicopter to assume a particular orientation when the multicopter rests at the cross-section. The number of grooves may equal the number of protrusions of the multicopter. The protrusions may be legs of the multicopter or motor compartments of the multicopter. Landing a multicopter on a landing platform may also include applying a yaw force to move the multicopter in response to detecting the multicopter being stuck at an abnormal orientation and/or the multicopter being stuck at an abnormal height above the cross-section. Landing a multicopter on a landing platform may also include lifting the multicopter from a resting position at the cross-section and applying a yaw force to move the multicopter in response to detecting a camera of the multicopter pointing in an undesirable direction. Landing a multicopter on a landing platform may also include shutting down the motors of the multicopter in response to the multicopter reaching the cross-section. Landing a multicopter on a landing platform may also include charging the multicopter with charging pads of the landing platform that engage contacts on the multicopter following shutting down the motors of the multicopter. Landing a multicopter on a landing platform may also include engaging for observation a camera of the multicopter following shutting down the motors of the multicopter. The landing platform may include a bottom segment coupled to the bottom portion of the top segment at the cross-section and the bottom portion may maintain the multicopter in an upright position.

The proposed system employs a funnel-shaped landing platform with non-circular horizontal cross-sections at a continuous range of heights in the top portion of the funnel. Specifically, the horizontal cross-sections of the platform smoothly deform from the top edge of the platform, or from another cross-section below the top edge into a landing cross-section, that is, the cross-section of the platform at the final resting height during the multicopter landing. The landing cross-section is a polygon with rounded corners and flattened or concave sides. The deformation of upper cross-sections into the landing cross-section forms grooves extending above the corners of the landing cross-section, and ridges alternating with grooves and extending above the sides of the landing cross-section. The inner surface of the landing platform orients the multicopter during landing by meeting designated clocking features of the multicopter. Clocking features of the multicopter are portions of the multicopter that protrude and engage the landing platform, such as legs, motor compartments or other protruding portions of the multicopter surface. The grooves direct the multicopter during the descent into a predetermined directional orientation. At a final landing position, clocking features of the multicopter (such as legs or motor compartments) are positioned at lowest possible points in the grooves, while charging contacts of the multicopter meet charging pads built into the funnel (for example, one charging pad per motor compartment). Additionally, the multicopter camera may continue surveillance of the area from the landing platform in a predetermined direction. The inside surface of the platform may be coated with a material, which has a low coefficient of friction, high strength, and high abrasion resistance for improving multicopter self-adjustment. The control system of the multicopter may detect and overcome rare cases of abnormal orientation of the multicopter, as well as pre-positioning and repositioning the multicopter to align the multicopter camera with a desired view direction.

Various aspects of system design, construction, and functioning are explained as follows.

1. Platform Shape, Features, and Benefits.

The inside of the landing platform is designed as a funnel with variable shapes and sizes of horizontal cross-sections, functionally subdivided into two vertical segments:

A top segment occupies the portion of the funnel from the top edge of the platform to the landing cross-section.

A bottom segment starts immediately below the horizontal landing cross-section and spans the interval to the bottom of the funnel.

Horizontal cross-sections of the top segment are continuously and smoothly deforming from the top edge of the platform to the landing cross-section, which represents the lowest cross-section of the segment. The landing cross-section is a polygon with rounded corners and flattened or concave sides, as explained elsewhere herein. Examples of shapes of the landing cross-section are a square with rounded corners and straight sides and an epitrochoid-like shape with concave sides. The number of corners/sides of the landing cross-section is driven by the number of clocking features of the multicopter. Thus, if the clocking features are represented by motor compartments, then the rounded square shape or a diamond-like epitrochoid shape of the landing cross-section corresponds to a quadcopter, while a rounded hexagon corresponds to a hexacopter.

After the landing, the multicopter rests at the landing cross-section; clocking features of the multicopter fit the grooves at the angles of the landing cross-section, whereas charging contacts of the multicopter meet the charging pads built into the platform.

The bottom segment of the funnel is optional and may be open or closed. The bottom segment may end with an opening at the bottom edge of the funnel that may touch the protruding bottom part of the multicopter to keep the multicopter in the upright position (in addition to the support received by the multicopter at the landing cross-section). The bottom segment may also be closed and may include other mechanisms for keeping the multicopter in the upright position.

The continuous deformation of the horizontal cross-sections forms grooves extending from the corners of the target shape and ridges along the sides of the target shape; such geometry of the inner surface of the landing platform ensures that the multicopter assumes one out of the several predetermined directional orientations, with the clocking features positioned at lowest possible points in the grooves at a final landing position of the multicopter.

Additional coating of the funnel surface with a material, which has a low coefficient of friction, high strength, and high abrasion resistance, may improve the kinetics of sliding of the multicopter along the funnel and facilitate the self-adjustment of the multicopter.

Using the control system of the multicopter to detect the height of the multicopter position at rest within the platform may also improve the self-adjustment of the multicopter by addressing rare cases of unstable balance where the control system may apply yaw to adjust the orientation of the multicopter.

One of the advantages of such self-orientation is the economic and compact construction of charging stations that may have charging pads built directly into the inner surface of the platform (for example, in the corners of the landing cross-section), so that the charging contacts of the multicopter rest on the charging pads at the final landing position allowing immediate charging.

Another advantage of the self-orientation of a multicopter is the use of the camera of the multicopter for surveillance of the territory around the landing platform in a fixed direction, corresponding to the camera direction at a final landing position. The surveillance may be performed through an opening or a window near the bottom of the landing platform. For example, a landing platform can be mounted on the roof of an industrial building and the camera of a self-oriented UAV may assume the role of a fixed surveillance camera. The control system may secure the preferred orientation of the camera by adjusting the orientation of the multicopter, as explained elsewhere herein.

2. Description of the Funnel Geometry.

The funnel forming the inner surface of the landing platform is defined by the shapes of horizontal cross-sections of the landing platform at different heights ranging from the top edge to the bottom edge of the funnel, including by the horizontal cross-sections of the top segment of the funnel responsible for the multicopter self-orientation. Each cross-section has a radial (rotational) symmetry, so that the distance between the surface of the funnel and the central vertical axis of the platform is the same on both ends of any diameter of each horizontal cross-section of the platform.

Due to the radial symmetry of the horizontal cross-sections, each cross-section may be approximately described by two characteristic concentric circles with centers of the circles positioned on the central vertical axis of the platform: the larger circumscribed circle, and the smaller inscribed circle (for any circular cross-section, the two circles coincide). The radial distance between the two characteristic circles of a cross-section at a given funnel height approximates the depth of the platform groove at that height. Accordingly, the two graphs $R(h)$, $r(h)$ showing the diameters of the characteristic circles at a given height of the platform approximate the funnel geometry and allow optimization of the funnel geometry, as explained in detail elsewhere herein.

3. Landing Process and Mechanical Reasons for Self-Orientation of the Multicopter.

The process of landing a multicopter on a landing platform includes:
(1) Positioning the multicopter over the top edge of the landing platform that forms the opening of the landing platform.
(2) Decreasing the multicolor thrust causing the multicopter to descend and touch a top segment of the landing platform.
(3) Guiding the multicopter with gravity toward a landing cross-section while the ridges and grooves in the top segment of the landing platform apply a rotational torque to the multicopter and cause the multicopter to assume a particular orientation.
(4) Shutting down the thrust when the multicopter comes to rest in the desired orientation at the landing cross-section that fits a shape corresponding to a portion of the multicopter The mechanical reasons for self-orientation of the multicopter are explained in detail as follows.

As the multicopter approaches the platform for landing, power to the multicopter is reduced to cause the multicopter to move downward when lift of the motors of the multicopter is less than the force of gravity acting on the multicopter. During landing, the multicopter tends to slide down to the lowest possible position in the funnel under the force of gravity, assuming the position with the lowest possible gravitational potential energy. Under normal conditions, the multicopter descends close to the straight vertical orientation, so that the multicopter is likely to touch the funnel with the lowest portion of the body of the multicopter, which may be one of the charging contacts of the multicopter or the bottom portion of the multicopter below the contacts. Alternatively, under stressful descending conditions, such as a strong wind, the multicopter may touch the inner part of the landing platform with a propeller guard.

In the latter case, when the multicopter touches the surface of the funnel during the descent, the asymmetric contact between the multicopter surface and the funnel interior surface may cause the multicopter to tilt to one side, causing the multicopter to spin around the vertical axis due to gyroscopic precession.

The vertical grooves rising from the corners of the landing cross-section at the bottom of the top segment of the platform are wide and shallow near the top and are increasingly narrowing and becoming deeper toward the bottom, while the highest points of the ridges between the grooves are at the midpoints of the sides of the landing cross-section (the sides may be straight, concave or have a different shape). This causes the gravitational potential energy of the multicopter to be lower in the grooves and higher between the grooves to thus favor a position where at least two of the three touch points of the multicopter with the funnel surface in the general touch configuration are in the grooves. The touch configuration creates a restoring torque in the direction of the nearest groove, while touching at the ridges causes an unstable equilibrium with the potential energy of the multicopter at a maximum.

The restoring torque increases as the multicopter slides down due to the shape of grooves. Additionally, the angular momentum of the multicopter gradually dissipates due to friction, and as the slope of the funnel increases with the downward movement along the vertical axis, such kinetics also tends to tilt the multicopter back toward the vertical, creating a precession torque in the opposite direction from the one exerted immediately upon touchdown, which would also tend to slow the rotation of the multicopter. At some point, the angular momentum of the multicopter is unable to overcome the opposing restoring torque, at which time the multicopter stops rotating and settles into the groove, sliding down along the groove to the landing cross-section.

Mechanical considerations, generally explained above, combined with the analysis of forces experienced by the multicopter descending with precession and interacting with non-circular intermediate cross sections and narrowing grooves, lead to a conclusion on the optimal progression of cross-sections along funnel. For the optimal funnel shapes, the deformation (homotopy) transforming the horizontal cross-section at the top edge of the funnel (often, a circle) or an intermediate horizontal cross-section below the top edge where the transformation starts into the landing cross-section should either have a constant rate of transformation or the rate of transformation should increase toward the bottom of the channel, which corresponds to a linear or a concave transformation curve, as explained elsewhere herein.

4. Avoiding and Overcoming Undesirable Landing Orientations.

A multicopter reaches a correctly aligned final landing orientation in almost all cases, with the only unlikely exception when the multicopter stops in the middle, in an undesirable orientation where the clocking features of the multicopter, such as the propeller enclosures, touch the slope of the funnel halfway between the grooves. The undesirable orientation is an orientation corresponding to a position of unstable equilibrium where the restoring torque acting on the multicopter is either absent or is insufficient to overcome the friction force. The likelihood of the multicopter assuming the undesirable orientation can be further reduced by coating the inside of the funnel with a material which has a low coefficient of friction, high strength, and high abrasion resistance. The low coefficient of friction will reduce the friction force and thereby allow the multicopter to be rotated toward the stable equilibrium by a smaller restoring torque.

Additionally, or alternatively, the control system of the multicopter may actively detect an abnormal orientation and/or height above the bottom of the funnel when the multicopter comes to rest and apply a sufficient yaw to move the multicopter out of the unstable equilibrium of the undesirable orientation.

Another incorrectly aligned orientation of the multicopter may occur when the camera of the multicopter designated for the fixed camera surveillance work described in Section 1 above ends up with a wrong view direction where the fixed camera cannot perform the surveillance function. In this case, the multicopter may be repositioned by lifting the multicopter, applying a yaw that orients the camera approximately in the right direction, and re-landing the multicopter.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a funnel-shaped landing platform with a segment of non-circular horizontal cross-sections causing self-orientation of a descending multicopter with protruding clocking features, directing charging contacts of the multicopter to rest on the charging pads integrated with the platform in a final landing position of the multicopter, and allowing video surveillance of a vicinity of the platform with the camera of multicopter resting in the final landing position.

Figure 1A:
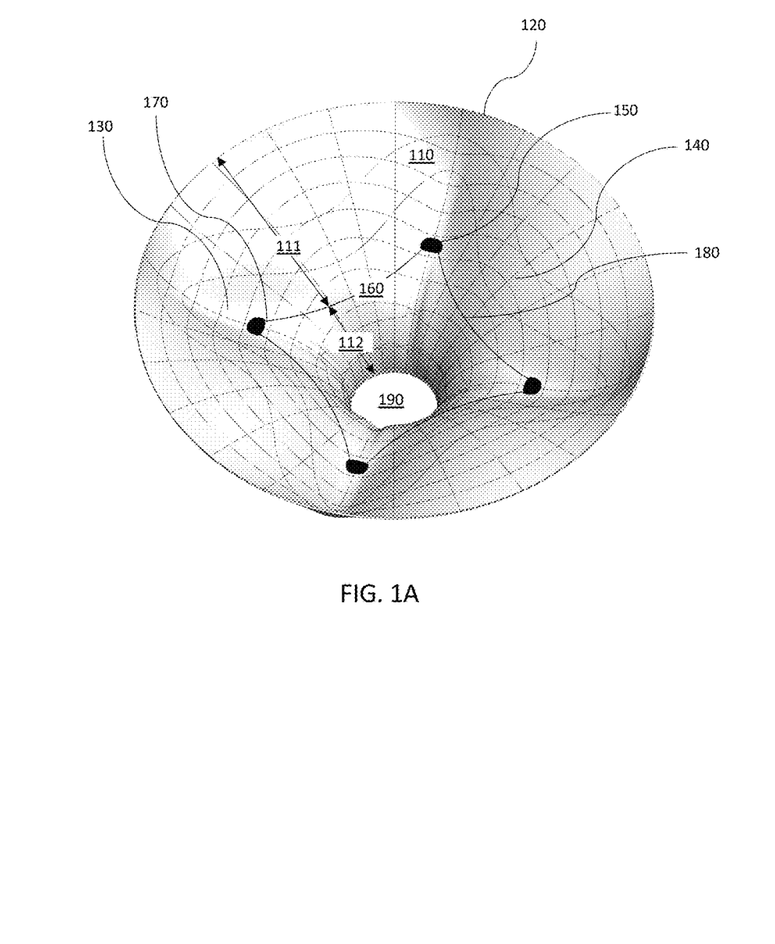
FIGS. 1A-1B are schematic illustrations of two variants of an interior view of a landing platform, according to an embodiment of the system described herein.
Figure 1B:
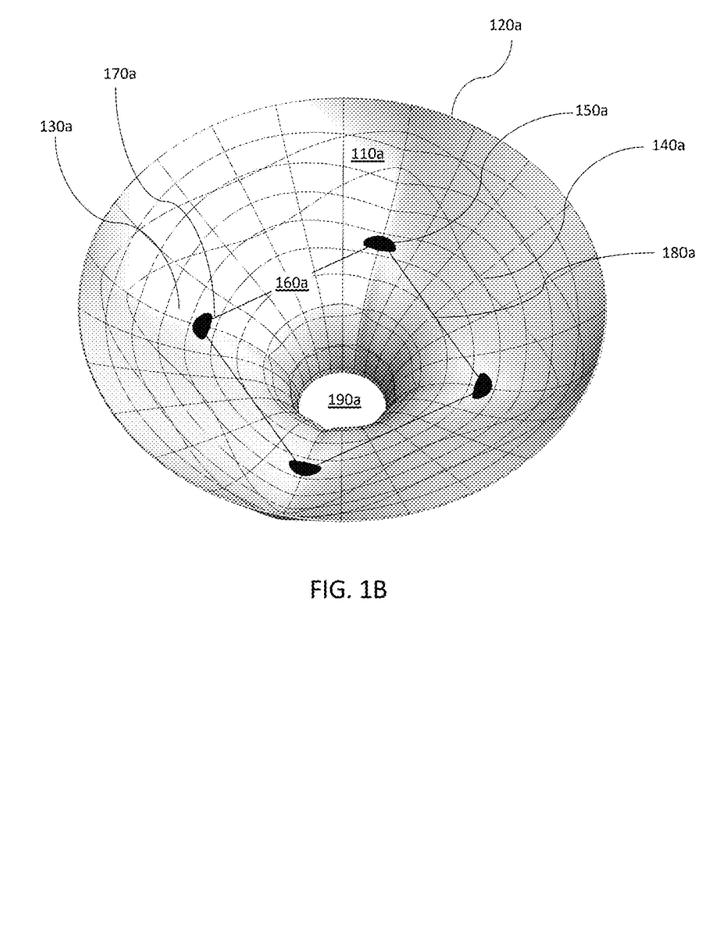

FIGS. 1A-1B are schematic illustrations of two variants of an interior view of a landing platform.

FIG. 1A schematically illustrates a landing platform 110 with a top segment 111 having a top opening and a small bottom opening and a bottom segment 112 coupled to the bottom opening of the top segment 111 (see Section 1 of the Summary for more information; height intervals for the segments are indicated by bidirectional arrows). A non-convex diamond-shaped landing cross-section 160 represents the lowest horizontal cross-section of the top segment 111 of the landing platform 110; the landing platform 110 of FIG. 1A is designed for a quadcopter landing. A circular top edge 120 of the landing platform 110 gradually and smoothly transforms into a landing cross-section 160 forming vertical grooves 130 in the top segment, which are ending up in corners 170 of the landing cross-section 160. A plurality of ridges 140 rise from the sides 180 of the landing cross-section 160. Charging pads 150 are built into a surface of the platform 110; in the illustration of FIG. 1A, the charging pads are placed in corners 170 of the landing cross-section 160. The bottom segment 112 ends with an opening 190 (see Section 1 of the Summary for discussion of the bottom segment). Note that the top edge 120 does not necessarily need to be circular and that the top opening formed by the top edge 120 does not necessarily need to be planar and is not necessarily coplanar with the cross-section 160. For example, one side of the top opening 120 may be higher than the rest of the top opening 120 to facilitate landing the multicopter.

FIG. 1B schematically illustrates a construction of an alternative landing platform 110a (also designed for landing of a quadcopter) with a convex landing cross-section 160a, which has the shape of a square with rounded corners; top and bottom segments are separated by the landing cross-section 160a and are not marked in FIG. 1B. Like in FIG. 1A, a circular top edge 120a of the landing platform 110a gradually and smoothly transforms into the landing cross-section 160a (a rounded square), forming vertical grooves 130a, ending up in corners 170a of the landing cross-section 160a, and ridges 140a, protruding from sides 180a of the landing cross-section. Charging pads 150a are built into a surface of the landing platform 110a and also placed, in this example, in the corners 170a of the landing cross-section. Like in FIG. 1A, the landing platform 110a has an opening 190a at the bottom. Also like FIG. 1A, the top edge 120a does not necessarily need to be circular and the top opening formed by the top edge 120a does not necessarily need to be planar and is not necessarily coplanar with the cross-section 160a. For example, one side of the top opening 120a may be higher than the rest of the top opening 120a to facilitate landing the multicopter.

Figure 2:
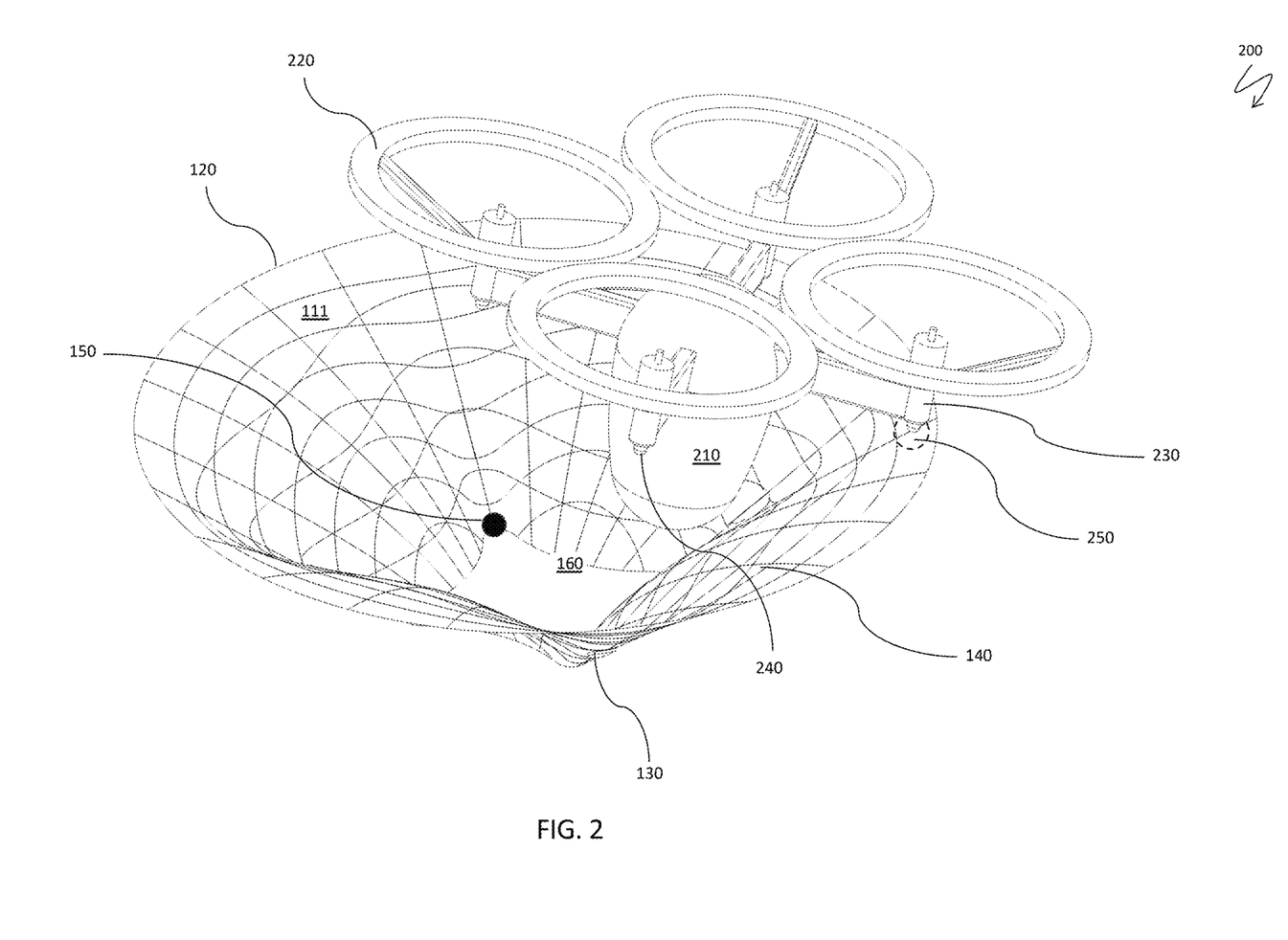
FIG. 2 is a schematic illustration of an initial landing position of a multicopter, according to an embodiment of the system described herein.

FIG. 2 is a schematic illustration 200 of an initial landing position of a multicopter. The top segment 111 of the landing platform (see FIG. 1A) with the top edge 120, the grooves 130, the ridges 140, the diamond-shaped landing cross-section 160 and the charging pads 150, receives a descending quadcopter 210, which represents any type of multicopter that may be used in connection with the system described herein. The quadcopter 210 has propeller enclosures 220, motor compartments 230, serving in this illustration as the clocking features, and charging contacts 240 at a bottom portion of the motor compartments 230. The quadcopter 210 first touches the landing platform 110 at a contact point 250 and starts the landing process, explained in Sections 3, 4 of the Summary.

Figure 3:
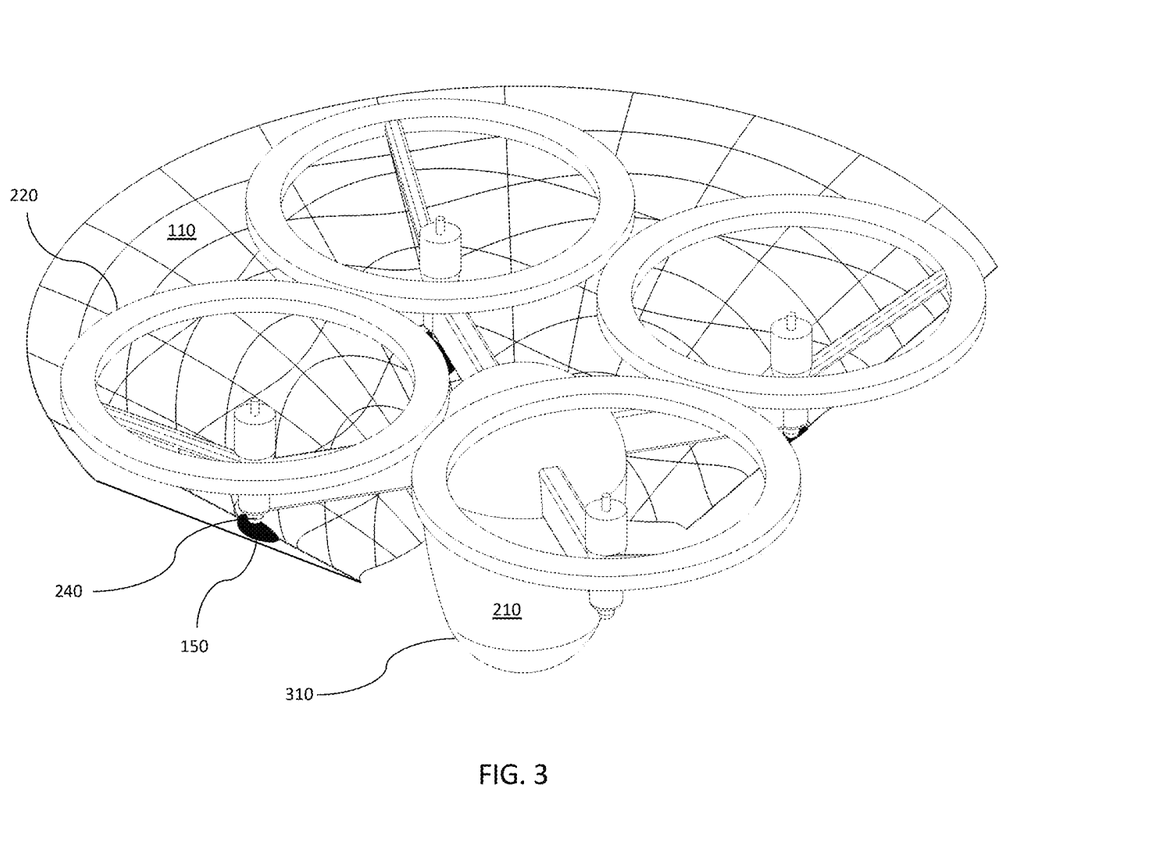
FIG. 3 is a schematic illustration of a final landing position of a multicopter resting at a landing cross-section of the landing platform, according to an embodiment of the system described herein.

FIG. 3 is a schematic illustration 300 of the final landing position of the quadcopter 210 resting at a landing cross-section of the landing platform. After touching the landing platform 110 (see FIG. 2) and descending with spin and precession along the funnel (the inner surface) of the landing platform 110, the quadcopter 210 is directed by the geometry of the landing platform 110 (including grooves and ridges, as explained in Section 3 of the Summary), which interacts with the clocking feature of the quadcopter 210. The quadcopter 210 ends up in a final (lowest possible) landing position, where the charging contacts 240 of the quadcopter 210 meet the charging pads 150, while a bottom portion 310 of the quadcopter 210 protrudes below the landing cross-section and may protrude further through the opening in the landing platform (not shown in FIG. 3), whereas the propeller enclosures 220 of the quadcopter 210 rest at the lowest position in upper parts of the grooves 130.

Figure 4:
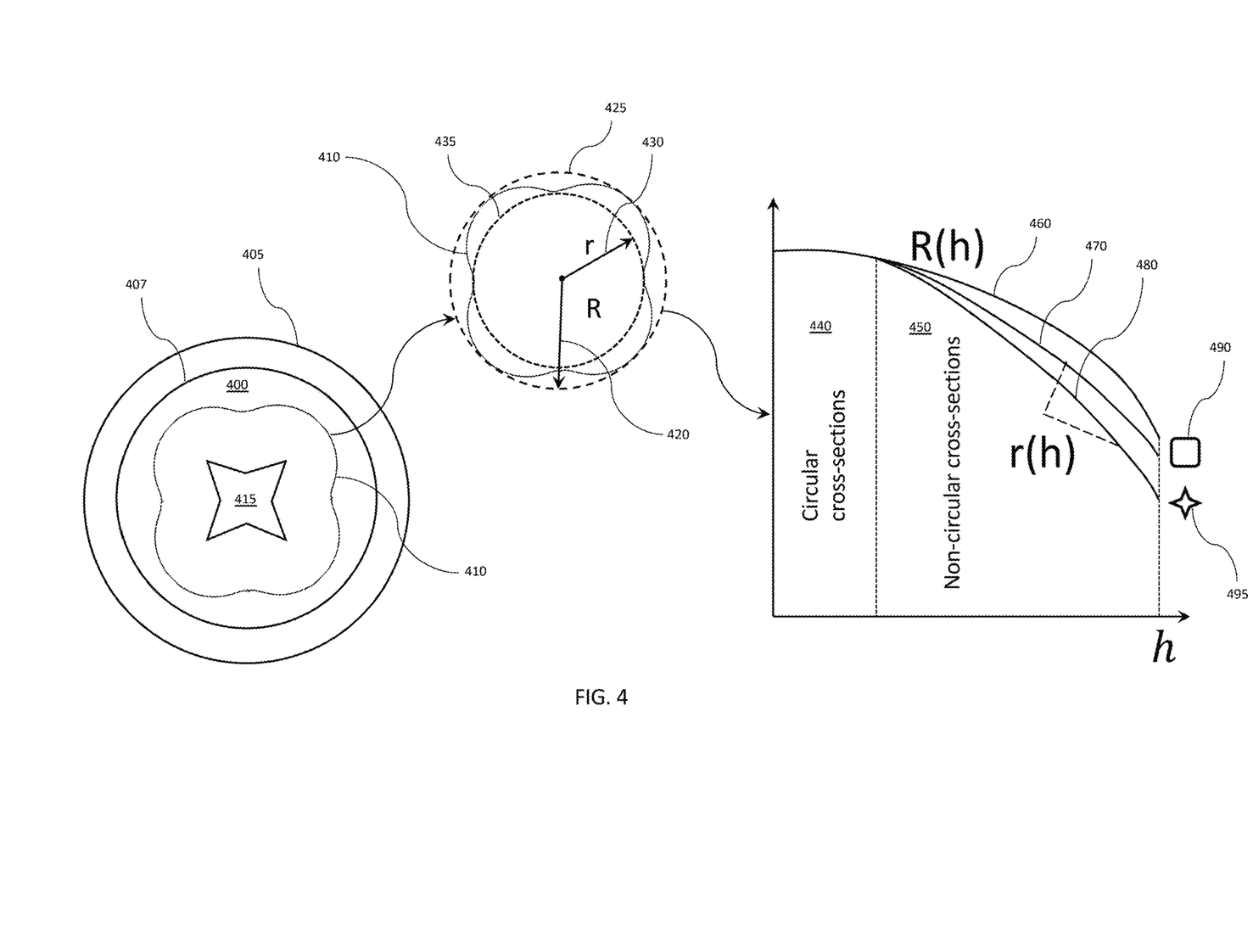
FIG. 4 is a schematic illustration of a funnel geometry for a landing platform, according to an embodiment of the system described herein.

FIG. 4 is a schematic illustration of a funnel geometry for a top segment 400 of a landing platform designed for a quadcopter landing. Cross-sections at different vertical levels of the top segment 400 of the landing platform include an upper edge, the circular cross-section 405, an intermediate circular cross-section 407, starting the range of transformations into non-circular intermediate cross-sections 410. The range of non-circular horizontal cross-sections ends with the diamond-shaped landing cross-section 415, which is similar to the landing cross-section 160 in FIG. 1A, discussed above. The intermediate cross-section 410 may be defined by sizes of two characteristic circles: a circumscribed circle 425 with a first radius 420, and an inscribed circle 435 with a second radius 430. Both of the radiuses 420, 430 may decrease as a height of the intermediate cross-section 410 varies from a maximum value at the upper edge cross-section 405 to a minimum value at the landing cross-section 415. In other words, the geometry of the funnel is defined by two graphs of monotonically decreasing functions $R(h)$, $r(h)$ explained in Section 2 of the Summary. Note that a horizontal axis h for the function graphs $R(h)$, $r(h)$ in FIG. 4 points in a direction of decreasing heights, so that an origin of coordinates of the graphs corresponds to a height of the top edge cross-section 405 and a right most value of the graphs indicated by a dashed vertical line is a height of the landing cross-section 415.

As explained above, an upper portion 440 of the landing platform may have circular cross-sections (between the horizontal cross-sections 405 and 407), where the two characteristic circles coincide, $R(h)=r(h)$. The transformation of the intermediate cross-sections 407, 410 into the landing cross-section 415 occurs in a right portion 450 of the graphs, where the circumscribed circle described by the function $R(h)$ is larger than the inscribed circle described by the function $r(h)$, $R(h)>r(h)$. Accordingly, all cross-sections in the right portion 450 of the graph (the bottom portion of the top segment 400) are non-circular. The shapes of the intermediate cross-sections in the bottom portion 450 may be convex, gradually transforming to the convex landing cross-section 490 (which is similar to the shape 160a in FIG. 1B), as illustrated by the two graphs 460, 470. Alternatively, the shapes of the intermediate cross-sections in the right portion 450 of the graph may be non-convex, converging to the non-convex diamond-shaped landing cross-section 495, as shown by the pair of graphs 460, 480.

A greater increase in a delta between the upper graph 460 and one of the lower graphs 470, 480 corresponds to the more pronounced grooves and ridges of the landing platform (see FIGS. 1A-1B).

As explained in Section 3, the more efficient geometries of the landing platform may be achieved with the concave shape of the three function graphs 460, 470, 480 in FIG. 4.

Figure 5:
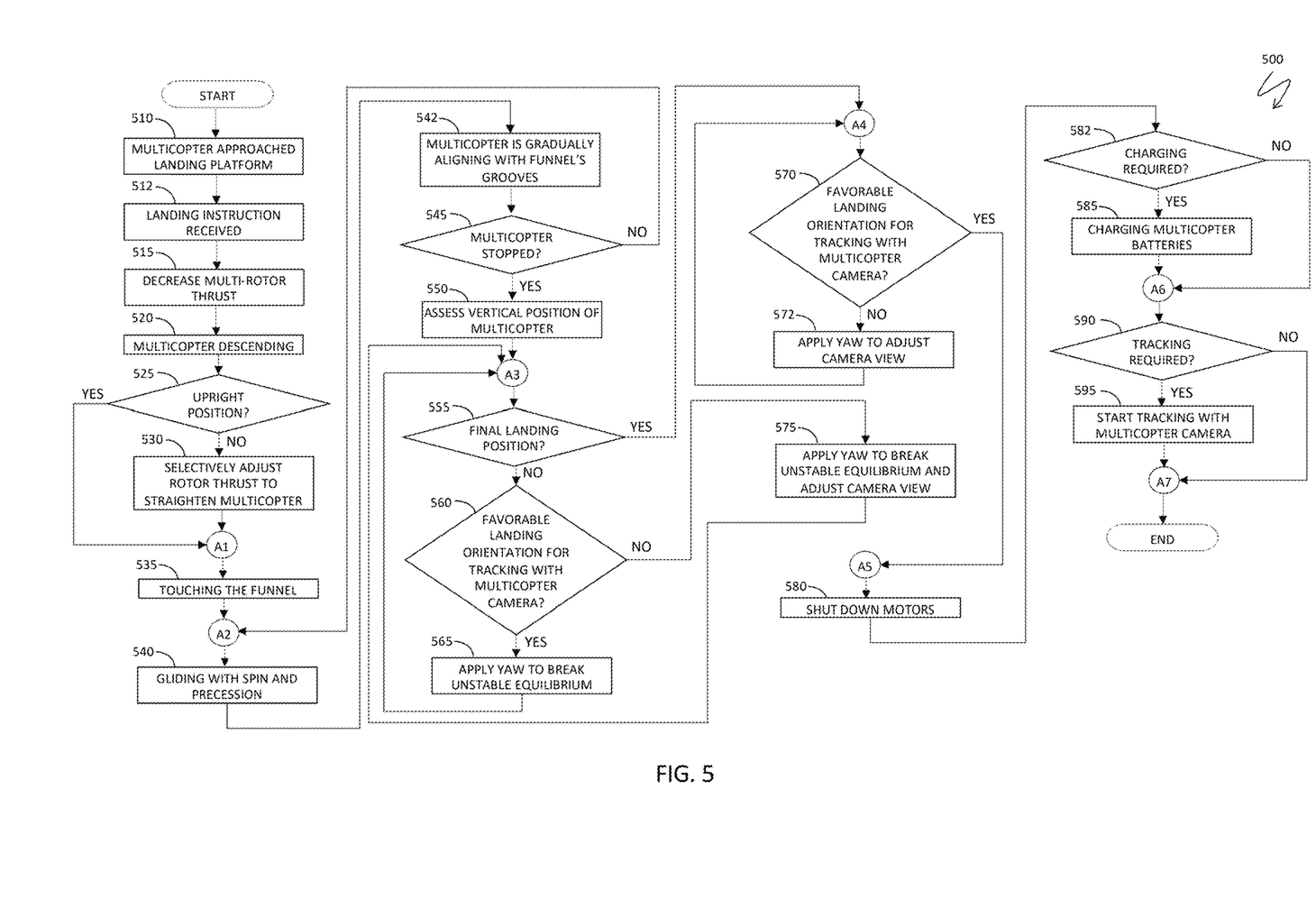
FIG. 5 is a system flow diagram illustrating system functioning in connection with multicopter landing with self-orientation, according to an embodiment of the system described herein.

Referring to FIG. 5, a system flow diagram 500 illustrates system functioning in connection with multicopter landing with self-orientation. Processing begins at a step 510, where a multicopter approaches the landing platform. After the step 510, processing proceeds to a step 512, where the multicopter receives landing instructions. After the step 512, processing proceeds to a step 515, where the multi-rotor thrust is decreased causing the multicopter to start descending. After the step 515, processing proceeds to a step 520, where the multicopter is descending. After the step 520, processing proceeds to a test step 525, where it is determined whether the multicopter is descending in the upright position. If not, processing proceeds a step 530, where the rotor thrust is selectively adjusted for some of the rotors to straighten the multicopter.

After the step 530, processing proceeds to a step 535, where the multicopter touches the funnel, as explained elsewhere herein (see FIG. 2 for more information). Note that the step 535 may be independently reached from the test step 530 if it is determined that the multicopter is descending in the upright position. After the step 535, processing proceeds to a step 540, where the multicopter is gliding with spin and precession, descending through the funnel of the landing platform, as explained elsewhere herein (see, for example, Section 3 of the Summary). After the step 540, processing proceeds to a step 542, where the multicopter is gradually aligning with funnel's grooves driven by the landing mechanics and by the geometry of the funnel and the multicopter surface with the clocking features.

After the step 542, processing proceeds to a test step 545, where it is determined whether the multicopter has stopped. If not, processing proceeds to the step 540, which may be independently reached from the step 535; otherwise, processing proceeds to a step 550, where the control system assesses the vertical position of the multicopter (see Section 4 of the Summary for explanations). After the step 550, processing proceeds to a test step 555, where it is determined whether the multicopter has reached the final landing position resting at the landing cross-section with the charging contacts of the multicopter having met the charging pads built into the landing platform. If not, processing proceeds to a test step 560, where it is determined whether the multicopter has a favorable landing orientation for tracking with the multicopter camera. If so, processing proceeds to a step 565, where the multicopter applies yaw to break the unstable equilibrium (the multicopter has stopped before reaching the final landing position, as explained elsewhere herein—see Section 4 of the Summary for more information). After the step 565, processing proceeds back to the test step 555, which may be independently reached from the step 550.

If it is determined at the test step 560 that the multicopter is not in a favorable landing orientation for tracking with the multicopter camera, processing proceeds to a step 575 where the multicopter applies yaw to break the unstable equilibrium (the multicopter has stopped before reaching the final landing position) and to adjust the camera view through reorienting the multicopter. After the step 575, processing proceeds to the test step 555, which may be independently reached from the steps 550, 565.

If it is determined at the test step 555 that the multicopter has reached the final landing position, processing proceeds to a test step 570, where it is determined whether the multicopter has a favorable landing orientation for tracking with the multicopter camera. If not, processing proceeds to a step 572, where yaw is applied to adjust to adjust the camera view. After the step 572, processing proceeds back to the test step 570, which may be independently reached from the test step 555. Note that the steps 570, 572 form a loop, which is resolved when the applied yaw is sufficient to orient the multicopter favorably for the potentially upcoming camera tracking activity.

If it is determined at the test step 570 that the multicopter has a favorable landing orientation for tracking with the multicopter camera, processing proceeds to a step 580, where the multicopter motors are shut down. Note also that, in some embodiments, a camera may not be used at all, in which case steps that test and adjust the camera would not be included so that, for example, and the path from the test step 555 to the step 570 would become a path from the test step 555 to the step 580. After the step 580, processing proceeds to a test step 582, where it is determined whether charging of the multicopter batteries is required. If so, processing proceeds to a step 585 where the multicopter batteries are charged. After the step 585, processing proceeds to a test step 590, where it is determined whether tracking with the multicopter camera is required (note that the test step 590 may be independently reached from the test step 582 if it is determined that charging is not required). If so, processing proceeds to a step 595, where the multicopter camera starts tracking the vicinity of the landing platform; otherwise, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations, tracking mechanisms and decisions may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A multicopter landing platform, comprising:
    a top segment having a first opening at a top portion thereof and a second, smaller opening at a bottom portion thereof;
    a cross-section at the opening of the bottom portion of the top segment; and
    a plurality of grooves formed in the top segment that are configured to guide a multicopter from the top portion of the top segment to the cross-section using gravity, the grooves configured to apply a rotational torque to the multicopter to cause the multicopter to assume a particular orientation as the multicopter descends from the first opening of the top segment toward the cross-section, wherein the grooves extend to the cross-section and are configured to cause the multicopter to rest at a fixed orientation when the multicopter is at the cross-section and wherein a shape of the cross-section is one of: a convex polygon with rounded corners and straight sides or an epitrochoid-like polygon with concave sides.

2. The multicopter landing platform of claim 1, wherein the grooves are configured to engage with protrusions on the multicopter to apply the rotational torque thereto.

3. The multicopter landing platform of claim 2, wherein the number of grooves is derived from the number of protrusions of the multicopter.

4. The multicopter landing platform of claim 1, wherein the shape of the cross-section has four sides.

5. The multicopter landing platform of claim 1, wherein the grooves are configured to rotate the multicopter to adopt the fixed orientation prior to the multicopter arriving at the cross-section.

6. The multicopter landing platform of claim 1, further comprising:
   charging pads that align with charging contacts of the multicopter when the multicopter rests at the cross-section.

7. The multicopter landing platform of claim 1, wherein the top opening is circular.

8. The multicopter landing platform of claim 1, wherein width of the grooves decreases and depth of the grooves increases as a distance from the top opening increases.

9. The multicopter landing platform of claim 1, further comprising:
   a bottom segment coupled to the bottom portion of the top segment at the cross-section, wherein the bottom portion is configured to maintain the multicopter in an upright position.

10. A multicopter landing platform, comprising:
    a top segment having a first opening at a top portion thereof and a second, smaller opening at a bottom portion thereof;
    a cross-section at the opening of the bottom portion of the top segment;
    a plurality of grooves formed in the top segment that are configured to guide a multicopter from the top portion of the top segment to the cross-section using gravity, the grooves configured to apply a rotational torque to the multicopter to cause the multicopter to assume a particular orientation as the multicopter descends from the first opening of the top segment toward the cross-section, wherein the grooves extend to the cross-section and are configured to cause the multicopter to rest at a fixed orientation when the multicopter is at the cross-section; and
    charging pads that align with charging contacts of the multicopter when the multicopter rests at the cross-section, wherein the charging pads are provided at an interior surface of the landing platform.

11. The multicopter landing platform of claim 10, wherein the charging pads are provided in the grooves of the landing platform.

12. The multicopter landing platform of claim 10, wherein the grooves are configured to engage with protrusions on the multicopter to apply the rotational torque thereto and a number of the grooves corresponds to a number of protrusions of the multicopter.

13. The multicopter landing platform of claim 10, wherein the top portion of the top segment has a circular cross-sectional shape, the bottom portion of the top segment has a non-circular cross-sectional shape, and the cross-section is diamond shaped.

14. A multicopter landing platform, comprising:
    a top segment having a first opening at a top portion thereof and a second, smaller opening at a bottom portion thereof;
    a cross-section at the opening of the bottom portion of the top segment; and
    a plurality of grooves formed in the top segment that are configured to guide a multicopter from the top portion of the top segment to the cross-section using gravity, the grooves configured to apply a rotational torque to the multicopter to cause the multicopter to assume a particular orientation as the multicopter descends from the first opening of the top segment toward the cross-section, wherein the cross-section is in a horizontal plane and the cross-section and additional cross-sections that are parallel have a radial symmetry and correspond to two concentric circles, one of the circles being circumscribed and the other one of the circles being inscribed and wherein a radial distance between the two concentric circles approximates a depth of the grooves at any of the cross-sections.

15. The multicopter landing platform of claim 14, wherein a change in shape of the landing platform from the top segment to the cross-section has one of: a constant rate of change or a rate of change that increase toward the cross-section, the rate of change providing a linear or a concave transformation curve.

16. The multicopter landing platform of claim 14, wherein the grooves are configured to engage with protrusions on the multicopter to apply the rotational torque thereto and a number of the grooves is derived from a number of the protrusions of the multicopter.

17. The multicopter landing platform of claim 14, wherein the top portion of the top segment has a circular cross-sectional shape, the bottom portion of the top segment has a non-circular cross-sectional shape, and the cross-section is diamond shaped.

18. A method of landing a multicopter on a landing platform, comprising:
    positioning the multicopter over a top segment of the landing platform, the top segment having a first opening at a top portion thereof, a second, smaller opening at a bottom portion thereof, and a cross-section at the opening of the bottom portion of the top segment;
    reducing thrust of the multicopter to cause the multicopter to touch the top segment and to descend in the landing platform, the top segment having grooves therein that engage with protrusions of the multicopter to guide the multicopter with gravity toward the cross-section;
    the multicopter moving downward toward the cross-section, wherein the grooves apply a rotational torque to the protrusions of the multicopter to cause the multicopter to assume a particular orientation when the multicopter rests at the cross-section; and
    applying a yaw force to move the multicopter in response to detecting at least one of: the multicopter being stuck at an abnormal orientation and/or the multicopter being stuck at an abnormal height above the cross-section.

19. The method of claim 18, wherein a number of the grooves equals a number of the protrusions of the multicopter and wherein the protrusions are one of: legs of the multicopter or motor compartments of the multicopter.

20. The method of claim 18, wherein the landing platform includes a bottom segment coupled to the bottom portion of the top segment at the cross-section and wherein the bottom portion maintains the multicopter in an upright position.

21. The method of claim 18, further comprising:
    charging the multicopter with charging pads of the landing platform that engage contacts on the multicopter following shutting down the motors of the multicopter; and
    engaging for observation a camera of the multicopter following shutting down the motors of the multicopter.

22. A method of landing a multicopter on a landing platform, comprising:
    positioning the multicopter over a top segment of the landing platform, the top segment having a first opening at a top portion thereof, a second, smaller opening at a bottom portion thereof, and a cross-section at the opening of the bottom portion of the top segment;

reducing thrust of the multicopter to cause the multicopter to touch the top segment and to descend in the landing platform, the top segment having grooves therein that engage with protrusions of the multicopter to guide the multicopter with gravity toward the cross-section;

the multicopter moving downward toward the cross-section, wherein the grooves apply a rotational torque to the protrusions of the multicopter to cause the multicopter to assume a particular orientation when the multicopter rests at the cross-section; and lifting the multicopter from a resting position at the cross-section and applying a yaw force to move the multicopter in response to detecting a camera of the multicopter pointing in an undesirable direction.

23. The method of claim 22, wherein a number of the grooves equals a number of the protrusions of the multicopter and wherein the protrusions are one of: legs of the multicopter or motor compartments of the multicopter.

24. The method of claim 22, further comprising:

charging the multicopter with charging pads of the landing platform that engage contacts on the multicopter following shutting down the motors of the multicopter; and engaging for observation a camera of the multicopter following shutting down the motors of the multicopter.

25. A method of landing a multicopter on a landing platform, comprising:

positioning the multicopter over a top segment of the landing platform, the top segment having a first opening at a top portion thereof, a second, smaller opening at a bottom portion thereof, and a cross-section at the opening of the bottom portion of the top segment;

reducing thrust of the multicopter to cause the multicopter to touch the top segment and to descend in the landing platform, the top segment having grooves therein that engage with protrusions of the multicopter to guide the multicopter with gravity toward the cross-section;

the multicopter moving downward toward the cross-section, wherein the grooves apply a rotational torque to the protrusions of the multicopter to cause the multicopter to assume a particular orientation when the multicopter rests at the cross-section; and shutting down the motors of the multicopter in response to the multicopter reaching the cross-section.

26. The method of claim 25, further comprising:

charging the multicopter with charging pads of the landing platform that engage contacts on the multicopter following shutting down the motors of the multicopter.

27. The method of claim 25, further comprising:

engaging for observation a camera of the multicopter following shutting down the motors of the multicopter.

28. The method of claim 25, wherein a number of the grooves equals a number of the protrusions of the multicopter and the protrusions are one of: legs of the multicopter or motor compartments of the multicopter.

* * * * *